US011959585B1

(12) United States Patent
Wang et al.

(10) Patent No.: US 11,959,585 B1
(45) Date of Patent: Apr. 16, 2024

(54) MOBILE PHONE CLIP

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 0 days.

(21) Appl. No.: 18/176,730

(22) Filed: Mar. 1, 2023

(30) Foreign Application Priority Data

Feb. 7, 2023 (CN) .......................... 202320248979.9

(51) Int. Cl.
*F16M 11/12* (2006.01)
*F16M 11/20* (2006.01)
*G06F 1/16* (2006.01)

(52) U.S. Cl.
CPC ....... F16M 11/126 (2013.01); F16M 11/2014 (2013.01); G06F 1/1613 (2013.01); *F16M 2200/022* (2013.01); *F16M 2200/024* (2013.01)

(58) Field of Classification Search
CPC ............ F16M 11/126; F16M 11/2014; F16M 2200/022; F16M 2200/024; G06F 1/1613

USPC ...................................................... 248/178.1
See application file for complete search history.

(56) References Cited

U.S. PATENT DOCUMENTS

| 9,133,982 | B1* | 9/2015 | Valdez | ................ F16M 13/022 |
| 9,557,002 | B2* | 1/2017 | Wong | ................ F16M 11/2064 |
| 9,968,188 | B1* | 5/2018 | Floersch | ............ F16M 11/2014 |
| 2015/0329062 | A1* | 11/2015 | Ackeret | .................. B60R 11/02 |
| | | | | 248/220.22 |
| 2023/0039211 | A1* | 2/2023 | Edwards | ................ B60R 7/084 |
| 2023/0051385 | A1* | 2/2023 | Ma | ........................ G06F 13/385 |

OTHER PUBLICATIONS https://bit.ly/45Wn481 Ulanz (Year: 2019).*

* cited by examiner

*Primary Examiner* — Muhammad Ijaz
(74) *Attorney, Agent, or Firm* — Westbridge IP LLC

(57) ABSTRACT

Disclosed is a mobile phone clip, including: a clamping member, a supporting member, and a base. The clamping member is rotatably connected to the supporting member through a first rotating assembly, the supporting member is rotatably connected to the base through the second rotating assembly, and a third rotating assembly is provided on the base. The second rotating assembly is configured to rotate supporting member to adjust a pitch angle of the mobile phone, the base is provided with a third rotating assembly for connecting an external equipment, and the third rotating assembly is configured to horizontally rotate the base to change an orientation of the mobile phone.

8 Claims, 7 Drawing Sheets

MOBILE PHONE CLIP

CROSS-REFERENCE TO RELATED APPLICATIONS

The present application claims priority to Chinese Patent Application No. 202320248979.9, filed on Feb. 7, 2023, the content of which is incorporated herein by reference in its entirety.

TECHNICAL FIELD

The present disclosure relates to the technical field of mobile phone accessories, and in particular to a mobile phone clip.

BACKGROUND

In modern society, smart phones are becoming more and more popular. With the increasingly rich functions of mobile phones, people's work and entertainment are all realized through mobile phones, thus the frequency of using mobile phones is increasing day by day.

For ease of use, people often use a mobile phone clip to clamp the mobile phone to free their hands and satisfy the cooperation of the mobile phone with external equipment such as a light and a microphone.

Existing mobile phone clips can only perform a transverse and a vertical conversion and adjust the pitch angle of the mobile phone. However, the mobile phone cannot be rotated horizontally. It is inconvenient to adjust the orientation angle of the mobile phone when cooperated with other external equipment such as a mobile phone and a camera.

SUMMARY

The technical problem to be solved by the present disclosure is that the mobile phone clip in the related art can only perform the transverse and vertical conversion and adjust the pitch angle of the mobile phone, but cannot adjust the orientation angle of the mobile phone.

In order to solve the above technical problems, the present disclosure provides a mobile phone clip, including:
- a clamping member provided with a clamping space for clamping the mobile phone;
- a supporting member rotatably connected with the clamping member through a first rotating assembly, the first rotating assembly can rotate the clamping member to adjust a transverse angle or a vertical angle of the mobile phone; and
- a base rotatably connected to the supporting member through a second rotating assembly, the second rotating assembly can rotate the supporting member to adjust a pitch angle of the mobile phone, the base is provided with a third rotating assembly for connecting an external equipment, and the third rotating assembly can horizontally rotate the base to change an orientation of the mobile phone.

In an embodiment, the first rotating assembly includes:
- a first rotating shaft connecting the clamping member and the supporting member, an outer wall of the first rotating shaft passing through the supporting member is provided with a thread; and
- a first locking member threadedly cooperated with the rotating shaft, the supporting member and the clamping member are clamped by screwing the first locking member.

In an embodiment, one end of the first rotating shaft is provided with a flange, the clamping member is provided with a groove for embedding the flange, the flange of the first rotating shaft is embedded into the groove of the clamping member and installed on the clamping member through a locking part, and the locking part is slidably cooperated with the supporting member.

In an embodiment, a jumping structure is provided on a mating surface between the locking part and the supporting member, and the jumping structure can locate a rotating angle of the clamping member relative to the supporting member.

In an embodiment, the jumping structure includes an arc-shaped protrusion and an arc-shaped depression cooperated with the arc-shaped protrusion.

In an embodiment, the third rotating assembly includes:
- a cold shoe seat arranged at a bottom of the base at a distance from the base, the cold shoe seat is provided with an internal threaded hole opposite to a through hole at the bottom of the base;
- a fastener connected to the internal threaded hole after penetrating the through hole of the base; and
- a second locking member sleeved on the cold shoe seat through a threaded structure, an upper end of the second locking member is abutted against the bottom of the base, after an abutment of the second locking member on the base is loosened, the base can rotate relative to the cold shoe seat.

In an embodiment, the base is provided with a pad cover partially penetrating the through hole, an outer wall of the penetration end of the pad cover is provided with at least one set of planar structures, a confining groove is arranged above the internal threaded hole of the cold shoe seat for embedding the planar structure, and an inner wall of the confining groove is provided with a confining plane fitted with the plane structure.

In an embodiment, the inner threaded hole of the cold shoe seat penetrates downwardly.

In an embodiment, a sidewall of the supporting member is provided with an embedding groove for embedding a wrench, and a magnetic attractive member is arranged in the embedding groove.

In an embodiment, the clapping member includes a fixed end and a movable end slidingly connected to the fixed end, and the fixed end and/or the movable end is provided with a first cold shoe opening for connecting an expansion equipment. The technical effects are as follows:

1. The mobile phone clip of the present disclosure is provided with a clamping member for clamping the mobile phone, the clamping member is rotatably connected to the supporting member through the first rotating assembly, and the clamping member is rotated by the first rotating assembly to convert the transverse and vertical angle of the mobile phone. The supporting member is rotatably connected to the base through the second rotating assembly, and the supporting member is rotated by the second rotating assembly to adjust the pitch angle of the mobile phone. The third rotating assembly on the base for connecting the external equipment can horizontally rotate the base, and can change the orientation angle of the mobile phone. The mobile phone clip provided by the present disclosure solves the problem in the prior art that the mobile phone clip can only perform transverse and vertical conversion and adjust the pitch angle the mobile phone, but cannot adjust the orientation angle of the mobile phone.

2. The first rotating assembly includes a first rotating shaft and a first locking member, the clamping member is connected to the supporting member through the first rotating shaft, the outer wall of the first rotating shaft passing through the supporting member is provided with the thread, the first locking member is threadedly cooperated with the rotating shaft, the supporting member and the clamping member are clamped by screwing the first locking member, so as to fix the angle of the clamping member.
3. The end of the first rotating shaft with the flange is embedded into the groove on the clamping member, the first rotating shaft is installed on the clamping member through the locking member, the locking member is slidabaly cooperated with the supporting member, and the clamping member can rotate relative to the supporting member.
4. The jumping structure on the mating surface between the locking part and the supporting member can locate the rotation angle of the clamping member relative to the supporting member, so that the clamping member can be rotated at a fixed angle.
5. The arc-shaped protrusion of the jumping structure is embedded in the arc-shaped depression to play a position-limiting role, and the arc-shaped protrusion on the locking part is cooperated with the arc-shaped depression on the supporting member, so that the locking part can drive the clamping member to be rotated at a fixed angle.
6. The third rotating assembly includes a cold shoe seat, a fastener and a second locking member, the fastener is connected to the internal threaded hole on the cold shoe seat through the through hole of the base, the cold shoe seat is sleeved with a second locking member through a threaded structure, the upper end of the second locking member is abutted against the bottom of the base, after the abutting of the second locking member and the base is fastened, the base can be fixed and the orientation of the mobile phone can remain original, and after the abutting of the second locking member and the base is loosened, the base can rotate relative to the cold shoe seat and the orientation of the mobile phone can be adjusted.
7. The outer wall of the penetration end of the pad cover penetrating the base is provided with at least one set of planar structures, the planar structure is embedded in the confining groove above the internal threaded hole of the cold shoe seat, and the inner wall of the confining groove is provided with the confining plane fitted with the plane structure. When the base rotates relative to the cold shoe seat, the pad sleeve is confined by the confining groove and does not rotate following the base, thus avoiding the fastener connecting the base and the cold shoe seat from being loosened due to the rotation back and forth.
8. The inner threaded hole of the cold shoe seat penetrates downwardly, so that the cold shoe seat can be connected to the external equipment through the threaded connection.
9. The sidewall of the supporting member is provided with the embedding groove for embedding the wrench, which is convenient to screw the fastener when adjusting the angle of the mobile phone clip, the magnetic attractive member is arranged in the embedding groove, which is used to magnetically fix the wrench, so to avoid dropping the wrench.
10. The clamping member is connected to the first rotating assembly through the fixed end, the movable end slidably connected to the fixed end can fit with electronic products of different sizes, and the first cold shoe on the fixed end and/or the movable end can be used to connect the expansion equipment.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the prior art. Obviously, the drawings in the following description are only part of embodiments of the present disclosure. For those of ordinary skill in the art, other drawings can also be obtained according to the structures shown in these drawings without any creative effort.

DETAILED DESCRIPTION OF THE EMBODIMENTS

Figure 1:
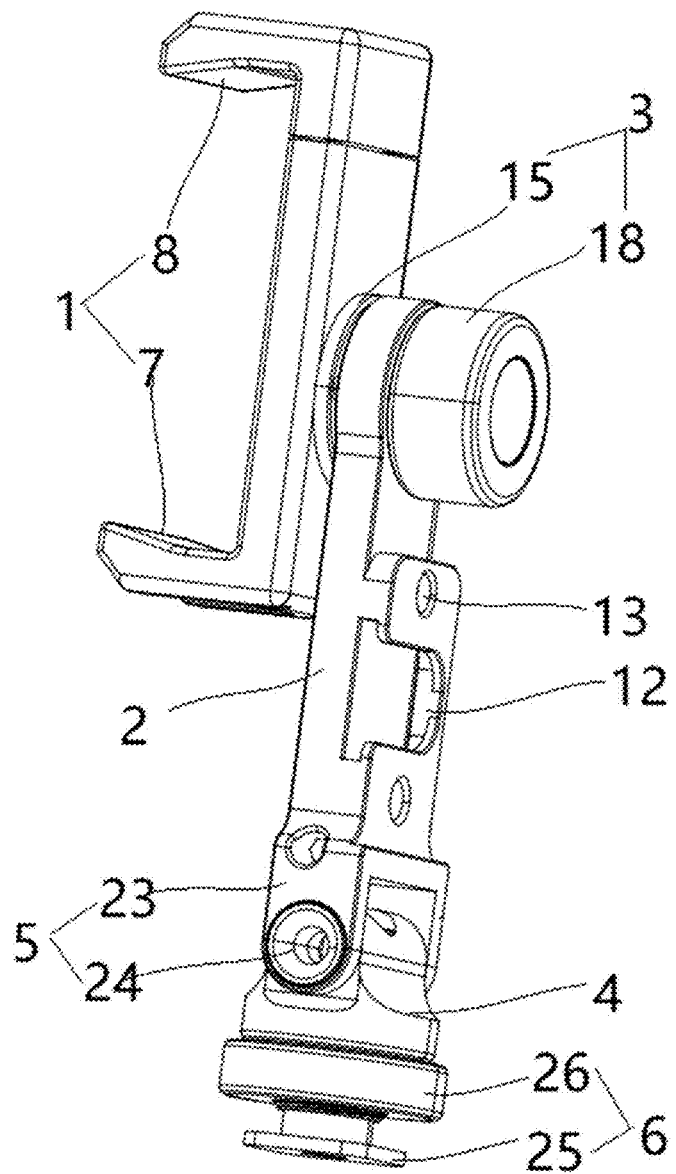
FIG. 1 is a schematic view of a mobile phone clip according to an embodiment of the present disclosure.

The technical solutions of the present disclosure will be clearly and completely described below with the accompanying drawings. Apparently, the described embodiments are only part of but not all of the embodiments. Based on the embodiments of the present disclosure, all other embodiments obtained by persons of ordinary skill in the art without making creative efforts belong to the protection scope of the present disclosure.

In the description of the present disclosure, it should be noted that terms "center", "upper", "lower", "left", "right", "vertical", "transverse", "inner", and "outer" etc. are indicated orientation or positional relationship based on the orientation or positional relationship shown in the drawings, and are only for the convenience of describing the present disclosure and simplifying the description, rather than indicating or implying that the referred device or element must have the specific orientation, use a specific orientation construction or an operation, therefore should not be construed as limiting the present disclosure. In addition, the terms "first", "second", and "third" are only used for descriptive purposes, and should not be construed as indicating or implying relative importance.

In the description of the present disclosure, it should be noted that unless otherwise specified and limited, the terms "installation", "connection", and "connection" should be understood in a broad sense. For example, it can be a fixed connection, a detachable connection, or an integral connection; it may be mechanically connected or electrically connected; it may be directly connected or indirectly connected through an intermediary, and it may be the internal communication of two components. Those of ordinary skill in the art can understand the specific meanings of the above terms in the present disclosure according to specific situations.

In addition, the technical features involved in the different embodiments of the present disclosure described below may be combined as long as they do not constitute a conflict with each other.

This embodiment provides a mobile phone clip for adjusting an orientation of a mobile phone, which can adjust the orientation of the mobile phone connected to an external equipment.

Referring to FIG. 1, the mobile phone clip includes a clamping member 1, a supporting member 2 and a base 4. The clamping member 1 is provided with a clamping space for clamping the mobile phone, the supporting member 2 is rotatably connected to the clamping member 1 through a first rotating assembly 3, the first rotating assembly is used to rotate the clamping member 1 to convert a transverse angle or a vertical angle of the mobile phone, the base 4 is rotatably connected with the supporting member 2 through the second rotating assembly 5, the second rotating assembly 5 is used to rotate the supporting member 2 to adjust a pitch angle of the mobile phone, the base 4 is provided with a third rotating assembly 6 for connecting an external equipment, and the third rotating assembly 6 is used to horizontally rotate the base 4 to change an orientation of the mobile phone.

When in use, the mobile phone is placed in the clamping space of the clamping member 1, the clamping member 1 is rotatably connected with the supporting member 2 through the first rotating assembly 3, and the first rotating assembly 3 rotates the clamping member 1 to convert the transverse and vertical angle of the mobile phone. The supporting member 2 is rotatably connected to the base 4 through the second rotating assembly 5, and the supporting member 2 can adjust the pitch angle of the mobile phone through the second rotating assembly 5. The third rotating assembly 6 on the base 4 for connecting the external equipment can make the base 4 horizontally rotate to change the orientation of the mobile phone. The mobile phone clip provided by this embodiment solves the problem in the prior art that the mobile phone clip can only perform the transverse and vertical conversion and adjust the pitch angle of the mobile phone, but cannot adjust the orientation angle of the mobile phone.

Figure 4:
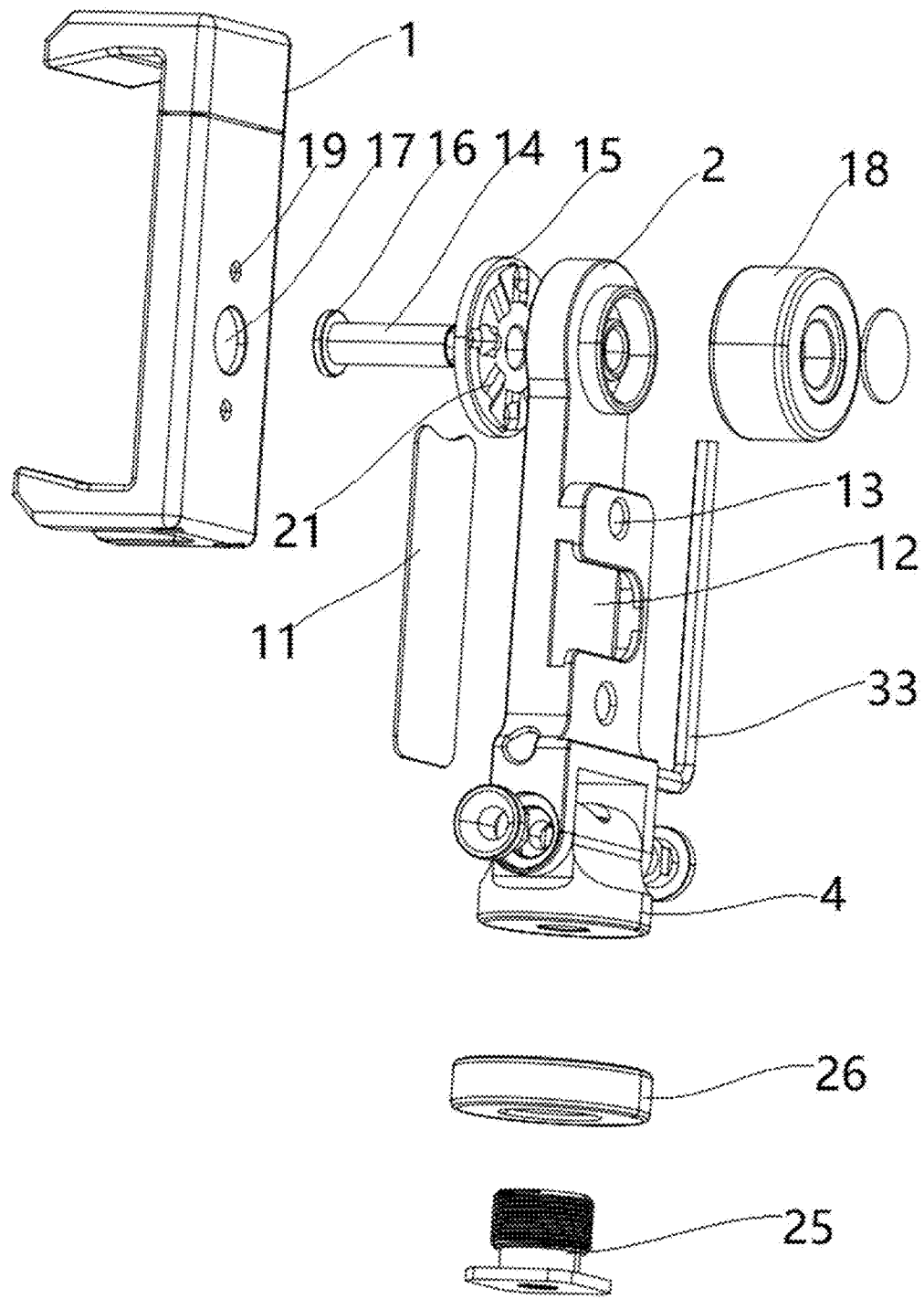
FIG. 4 is an explosion schematic view of the mobile phone clip in FIG. 1.

Referring to FIG. 4, the first rotating assembly 3 includes a first rotating shaft 14 connecting the clamping member 1 and the supporting member 2, an outer wall of the first rotating shaft 14 penetrating the supporting member 2 is provided with a thread, the first locking member 15 is threadedly cooperated with a rotating shaft, and the supporting member 2 and the clamping member 1 are clamped by screwing the first locking member 15. When in use, the clamping member 1 is connected to the supporting member 2 through the first rotating shaft 14, the first locking member 15 is threadedly cooperated with the rotating shaft 14 through the thread on the outer wall of the first rotating shaft 14 passing through the supporting member 2, the supporting member 2 and the clamping member 1 are clamped by screwing the first locking member 15, so as to fix the angle of the clamping member 1.

In an embodiment, the thread on the outer wall of the first rotating shaft 14 can be replaced with an internal thread, the fastener penetrates the through hole of the first locking member 15 to get connected to the internal thread of the first rotating shaft 14, so that the supporting member 2 and the clamping member 1 are clamped.

Referring to FIG. 4, one end of the first rotating shaft 14 is provided with a flange 16, and the clamping member 1 is provided with a groove 17 for embedding the flange 16, the flange 16 of the first rotating shaft 14 is embedded into the groove 17 of the clamping member 1 and installed on the clamping member 1 through the locking part 18, and the locking part 18 is rotatably cooperated with the supporting member 2. When in use, the end of the first rotating shaft 14 with the flange 16 is embedded into the groove 17 on the clamping member 1, and the first rotating shaft 14 is installed on the clamping member 1 through the locking part 18, the locking part 18 is cooperated with the supporting member 2, so that the clamping member 1 can rotate relative to the supporting member 2. Specifically, a second mounting hole 19 is oppositely arranged on the locking part 18 and the clamping member 1, a fastener is locked in the second mounting hole 19 to fix.

In an embodiment, the locking part 18 may be integrally formed on the clamping member 1, the groove 17 is provided at a middle position of the locking part 18, the first rotating shaft 14 is embedded into the groove 17, and the first rotating shaft 14 is installed on the locking part 18 through a washer.

Figure 3:
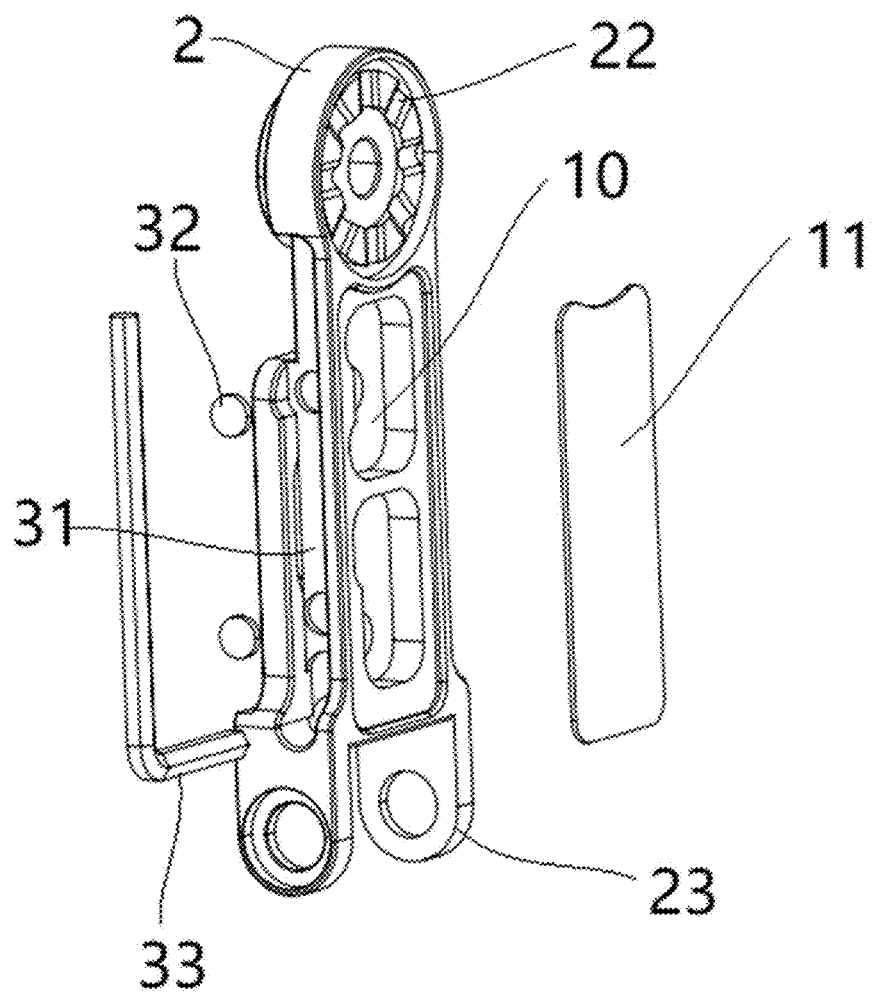
FIG. 3 is a schematic view of a supporting member in FIG. 1.

Referring to FIG. 3 and FIG. 4, a jumping structure is provided on a mating surface between the locking part 18 and the supporting member 2, and the jumping structure is used for positioning a rotation angle of the clamping member 1 relative to the supporting member 2. When in use, the jumping structure is provided on the mating surface between the locking part 18 and the supporting member 2, and the jumping structure is used to locate the rotation angle of the clamping member 1 relative to the supporting member 2, so that the clamping member 1 can be rotated at a fixed angle.

Referring to FIG. 3 and FIG. 4, the jumping structure includes an arc-shaped protrusion 21 and an arc-shaped depression 22 cooperated with the arc-shaped protrusion 21. When in use, the arc-shaped protrusion 21 of the jumping structure is embedded in the arc-shaped depression 22 to play a position-limiting role. Specifically, the arc-shaped protrusion 21 is arranged on the locking part 18, the arc-shaped depression 22 is arranged on the supporting member 2, and the arc-shaped protrusion 21 on the locking part 18 is cooperated with the arc-shaped depression 22 on the supporting member 2, so that the locking part 18 can drive the clamping member 1 to be rotated at the fixed angle.

In an embodiment, the arc-shaped protrusion 21 and the arc-shaped depression 22 may also be replaced by a hemispherical protrusion and a hemispherical depression.

Referring to FIG. 4, the second rotating assembly 5 includes a turret 23 and a fastener, the turret 23 is arranged at one end of the supporting member 2 close to the base 4, a third mounting hole 24 is provided on the turret 23 and the base 4, and the turret 23 is installed on the base 4 by locking the fastener, so that the supporting member 2 can adjust the pitch angle of the mobile phone.

Figure 5:
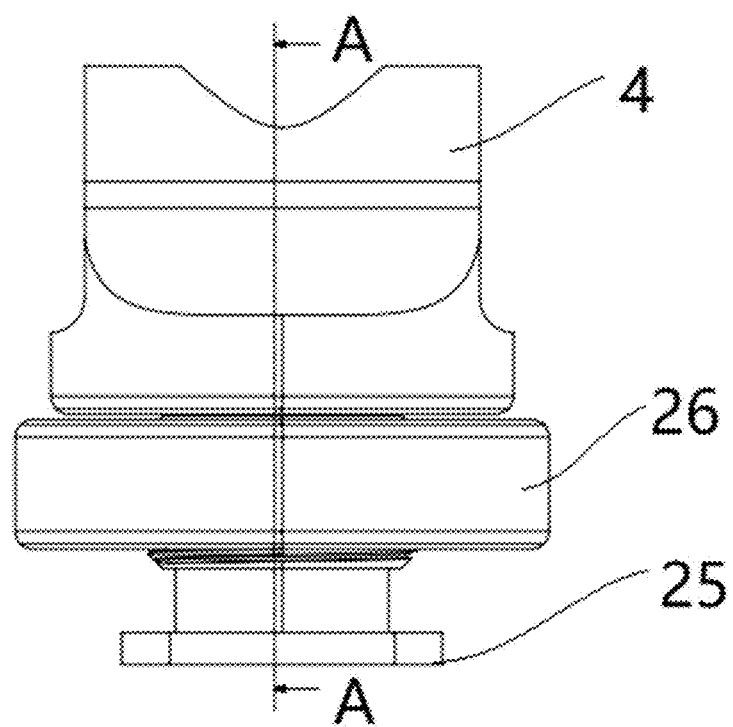
FIG. 5 is a schematic view of a base and a third rotating assembly in FIG. 1.
Figure 6:
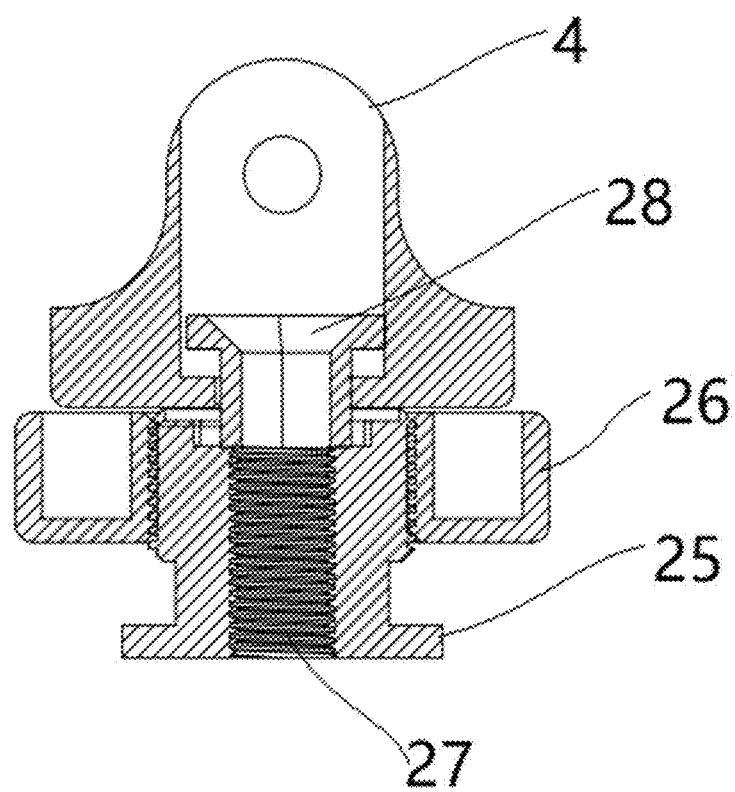
FIG. 6 is a cross-sectional view at portion A in FIG. 5.

Referring to FIG. 5 and FIG. 6, the third rotating assembly 6 includes: a cold shoe seat 25, a fastener and a second locking member 26, the cold shoe seat 25 and the base 4 are arranged at the bottom of the base 4 at intervals, and the cold shoe seat 25 is provided with an internal threaded hole 27 opposite to the through hole at the bottom of the base 4, the fastener penetrates the through hole of the base 4 to get connected to the internal threaded hole 27, the second locking member 26 is sleeved on the cold shoe seat 25 through a threaded structure, an upper end of the second locking member 26 is abutted against a bottom of the base 4, after an abutting of the second locking member 26 to the base 4 is loosened, the base 4 can rotate relative to the cold shoe seat 25. When in use, the fastener penetrates the through hole of the base to get connected to the internal threaded hole 27 of the cold shoe seat 25, the second locking member 26 is sleeved on the cold shoe seat 25 through the threaded structure, the upper end of the second locking member 26 is abutted against the bottom of the base 4. After the abutting of the second locking member 26 to the base 4 is fastened, an orientation of the mobile phone can remain original, after the abutting of the second locking member 26 to the base 4 is loosened, the base 4 can rotate relative to the cold shoe seat 25 to change the orientation of the mobile phone.

Figure 7:
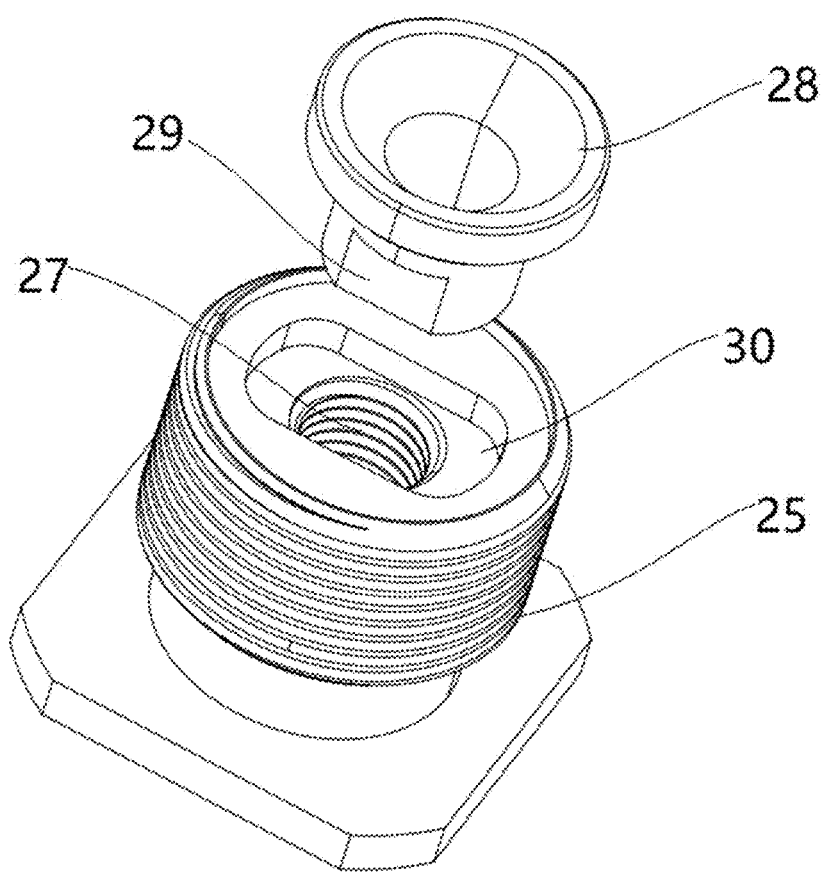
FIG. 7 is a schematic view of a cold shoe seat and a pad cover in FIG. 5.

Referring to FIG. 6 and FIG. 7, the base 4 is provided with a pad cover 28 partially penetrating the through hole, and an outer wall of a penetration end of the pad cover 28 is provided with at least one set of planar structures 29 embedded in the confining groove 30 above the internal threaded hole of the cold shoe seat 25, an inner wall of the confining groove 30 is provided with a confining plane fitted with the planar structure 29. When the base 4 rotates relative to the cold shoe seat 25, the pad cover is confined by the confining groove 30 and does not rotate following the base 4 so as to avoid a loosening of the fastener due to a back and forth rotation.

Referring to FIG. 6, the inner threaded hole 27 of the cold shoe seat 25 penetrates downwardly. When in use, the cold shoe seat 25 is connected to an external equipment through a threaded connection. Specifically, the bottom of the cold shoe seat 25 is provided with a clamping sliding platform, which is convenient to be connected to the cold shoe opening of other equipment by clamping.

Referring to FIG. 3, an embedding groove 31 for embedding a wrench 33 is provided on a sidewall of the supporting member 2, and a magnetic attractive member 32 is provided in the embedding groove 31. When in use, the wrench 33 is embedded and stored in the embedding groove 31, which is convenient to use the wrench 33 to screw the fastener when adjusting the angle of the mobile phone, and the wrench 33 is magnetically fixed by the magnetic attractive member 32 in the embedding groove 31, so as to avoid dropping the wrench 33. In an embodiment, the magnetic attractive member 32 can be omitted, and a buckle is provided on an outside of the embedding groove 31, or other ways of fixing the wrench 33 to prevent it from falling can also be used.

Specifically, referring to FIG. 3 and FIG. 4, the supporting member 2 is provided with a hollow structure 10 covered with a cover plate 11, and the hollow structure 10 is used to reduce an overall weight. The supporting member 2 is provided with at least one second cold shoe opening 12 for externally connecting an expansion equipment, and a first mounting hole 13 is provided on both sides of the second cold shoe opening 12. When the expansion equipment is heavy, the fastener can be locked in the first mounting hole 13 to fix the expansion equipment, so as to increase the stability of the expansion device and prevent it from falling over.

Figure 2:
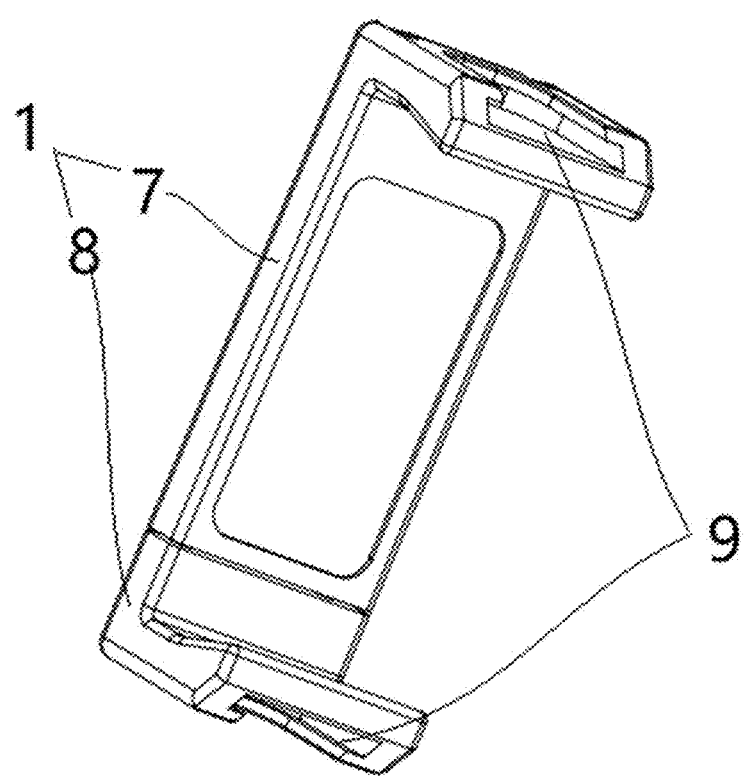
FIG. 2 is a schematic view of a clamping member in FIG. 1.

Referring to FIG. 2, the clamping member 1 includes: a fixed end 7 and a movable end 8 slidably connected to the fixed end, and the fixed end 7 and/or the movable end 8 is provided with a first cold shoe opening 9 for connecting the expansion equipment. When in use, the fixed end 7 is connected to the supporting member 2 through the first rotating assembly 3, and the movable end 8 is slidably connected to the fixed end 7. When the mobile phone is clamped, the movable end 8 can move in a direction away from the fixed end 7, so as to be adapted to mobile phones or other electronic devices of different sizes and models. The fixed end 7 and/or the movable end 8 are provided with a first cold shoe 9 for connecting the expansion equipment. Specifically, the movable end 8 is connected to the fixed end 7 through an elastic assembly. When the mobile phone or electronic device are placed on the clamping member 1, the elastic assembly can provide an elastic force from the movable end 8 towards the fixed end to clamp, and the inside of the clamping member 1 is provided with a washer to anti-slip and anti-scratch the mobile phone.

Referring to FIG. 1, when the mobile phone clip is in use, the mobile phone is placed in the clamping space of the clamping member 1. The clamping member 1 is rotatably connected to the supporting member 2 through the first rotating assembly 3, and the clamping member 1 is rotated by the first rotating assembly 3 to convert the transverse and vertical angle of the mobile phone. The supporting member 2 is rotatably connected to the base 4 through the second rotating assembly 5, and the supporting member 2 is rotated by the second rotating assembly 5 to adjust the pitch angle of the mobile phone. The third rotating assembly 6 on the base 4 for connecting the external equipment can horizontally rotate the base 4, and can change the orientation angle of the mobile phone. The mobile phone clip provided by the present disclosure solves the problem in the prior art that the mobile phone clip can only perform transverse and vertical conversion and adjust the pitch angle the mobile phone, but cannot adjust the orientation angle of the mobile phone.

Apparently, the above-mentioned embodiments are only examples for clear description, rather than limiting the present disclosure. For those of ordinary skill in the art, other changes in different forms can be made based on the above description. It is not necessary and impossible to exhaustively list all the embodiments here. The obvious changes derived therefrom are still within the scope of the present disclosure.

What is claimed is:

1. A mobile phone clip, comprising:
a clamping member provided with a clamping space for clamping a mobile phone;
a supporting member rotatably connected with the clamping member through a first rotating assembly, wherein the first rotating assembly is configured to rotate the clamping member to adjust a transverse angle or a vertical angle of the mobile phone; and
a base rotatably connected to the supporting member through a second rotating assembly, wherein the second rotating assembly is configured to rotate the supporting member to adjust a pitch angle of the mobile phone, the base is provided with a third rotating assembly for connecting an external equipment, and the third rotating assembly is configured to horizontally rotate the base to change an orientation of the mobile phone,
wherein the first rotating assembly comprises:
a first rotating shaft connecting the clamping member and the supporting member, wherein an outer wall of the first rotating shaft passing through the supporting member is provided with a thread; and
a first locking member threadedly cooperated with the first rotating shaft, wherein the supporting member and the clamping member are clamped by screwing the first locking member,
wherein one end of the first rotating shaft is provided with a flange, the clamping member is provided with a groove for embedding the flange, the flange of the first rotating shaft is embedded into the groove of the clamping member and installed on the clamping member through a locking part, and the locking part is slidably cooperated with the supporting member.

2. The mobile phone clip of claim 1, wherein a jumping structure is provided on a mating surface between the locking part and the supporting member, and the jumping structure is configured to locate a rotating angle of the clamping member relative to the supporting member.

3. The mobile phone clip of claim 2, wherein the jumping structure comprises an arc-shaped protrusion and an arc-shaped depression cooperated with the arc-shaped protrusion.

4. The mobile phone clip of claim 1, wherein the third rotating assembly comprises:
- a cold shoe seat arranged at a bottom of the base at a distance from the base, wherein the cold shoe seat is provided with an internal threaded hole opposite to a through hole at the bottom of the base;
- a fastener connected to the internal threaded hole after penetrating the through hole of the base; and
- a second locking member sleeved on the cold shoe seat through a threaded structure, wherein an upper end of the second locking member is abutted against the bottom of the base, after an abutment of the second locking member on the base is loosened, the base is configured to rotate relative to the cold shoe seat.

5. The mobile phone clip of claim 4, wherein the base is provided with a pad cover partially penetrating the through hole, an outer wall of a penetration end of the pad cover is provided with at least one set of planar structures, a confining groove is arranged above the internal threaded hole of the cold shoe seat for embedding the planar structure, and an inner wall of the confining groove is provided with a confining plane fitted with the planar structure.

6. The mobile phone clip of claim 4, wherein the inner threaded hole of the cold shoe seat penetrates downwardly.

7. The mobile phone clip of claim 1, wherein a sidewall of the supporting member is provided with an embedding groove for embedding a wrench, and a magnetic attractive member is arranged in the embedding groove.

8. The mobile phone clip of claim 1, wherein the clapping member comprises a fixed end and a movable end slidingly connected to the fixed end, and the fixed end and/or the movable end is provided with a first cold shoe opening for connecting an expansion equipment.

\* \* \* \* \*